United States Patent [19]

Nola

[11] 4,417,190

[45] Nov. 22, 1983

[54] CONTROL SYSTEM FOR AN INDUCTION MOTOR WITH ENERGY RECOVERY

[75] Inventor: Frank J. Nola, Huntsville, Ala.

[73] Assignee: The United States of America as represented by the Administrator of the National Aeronautics and Space Administration, Washington, D.C.

[21] Appl. No.: 350,472

[22] Filed: Feb. 19, 1982

Related U.S. Application Data

[63] Continuation-in-part of Ser. No. 243,683, Mar. 16, 1981, and Ser. No. 297,524, Aug. 28, 1981.

[51] Int. Cl.³ .............................................. H02P 5/40
[52] U.S. Cl. .................................. 318/729; 318/798; 318/806
[58] Field of Search ........................ 318/729, 806, 798

[56] References Cited

U.S. PATENT DOCUMENTS 3,381,205  4/1968  Howell et al. ........................ 363/72
4,280,038  7/1981  Havas et al. ......................... 363/37

Primary Examiner—David Smith, Jr.
Attorney, Agent, or Firm—Joseph H. Beumer; John R. Manning; Leon D. Wofford, Jr.

[57] ABSTRACT

A control circuit for an induction motor powered system wherein a power factor controlled servo loop is used to control, via the phase angle of firing of a triac (16), the power input to the motor (14) as a function of load placed on the motor (14) by machinery of the powered system. Then, upon application of torque by this machinery to the motor (14), which tends to overspeed the motor, the firing angle of the triac (16) is automatically set to a fixed, and relatively short, firing angle.

6 Claims, 4 Drawing Figures

FIG. 2

CONTROL SYSTEM FOR AN INDUCTION MOTOR WITH ENERGY RECOVERY

ORIGIN OF THE INVENTION

The invention described herein was made by an employee of the U.S. Government and may be manufactured and used by or for the government of the U.S. for governmental purposes without the payment of any royalties thereon or therefor.

This application is a continuation-in-part of application Ser. No. 243,683, filed Mar. 16, 1981, entitled "Energy Saving Phase Control For Induction Generators," and of application Ser. No. 297,524, filed Aug. 28, 1981, entitled "Motor Power Control Circuit For A.C. Induction Motor."

TECHNICAL FIELD

This invention relates generally to control systems for induction motors, and particularly to a control system adapted to enhance the recovery of power from such a motor when it is caused to overspeed to speeds in excess of its synchronization speed.

BACKGROUND ART

There are many instances where loading effects on induction motors vary, in some instances, varying from a full load condition to an essentially no-load condition. In other instances, devices connected to a motor product a variable coupling which may vary from a state of the imposition of a substantial load on the motor, through a zero load state, and through one or more drive states wherein the device applies discrete torques back on the motor.

One example of such a multi-state operation occurs with lift pumps, such as used in pumping oil from oil wells. During the upstroke, or portion of the pumping stroke during which oil is being lifted, the motor applies a torque to the pump; and during a portion of the return, or downstroke, of the pump, torque is applied by the pump back to the motor. Depending upon the force of this downstroke, the motor will, to a degree, be caused to speed up and may exceed the basic synchronization speed (line frequency divided by pairs of poled of the motor gives sync speed in resolutions per second) of the motor. When this occurs, there will be two effects. One, the motor commences to generate power and to supply it back to the power line to which it is connected; and two, coordinately, the motor reflects a braking force back on the pump. Both these effects increase with applied torque generally up to approximately the horsepower rating of the motor. The effective speed range for power generation varies with different motors from approximately synchronous speed to 101% to 104% of sync speed.

It is obvious that the generating effect described is most desirable, as it reduces the average power drawn by the motor. This reduction is manifested by either the reduction in rate of operation of a power meter, or, where no other power is being drawn by the user of the motor, by an actual reversal of the power meter during the power generation state. Significant to the present invention, the efficiency of power generation by an induction motor simply directly connected to a power line varies directly as a function of the driving force. Thus, if the driving force is equal to or near the horsepower rating of the motor, then efficiency and power generation is at a maximum for that motor. However, if the driving force is less than this, which is often the case, then the efficiency of power generation declines. This efficiency relationship is essentially the same for an induction motor operating in a motor mode, as its efficiency suffers substantially when it is operated in either an unloaded or a lightly loaded mode.

The applicant has previously addressed both the motor mode and generating mode efficiency problems, with the motor mode being dealt with in his Pat. Nos. 4,052,648 and 4,266,177 and in referenced pending application Ser. No. 297,524, and the generating mode being the subject of the applicant's referenced pending application Ser. No. 243,683.

U.S. Pat. Nos. 4,052,648 and 4,266,177 and pending application Ser. No. 297,524 disclose control circuitry wherein power loss normally experienced in unloaded or lightly loaded induction motors are substantially reduced by varying the power input to the motor as a direct function of the detected power factor of operation of the motor.

The applicant's pending application Ser. No. 243,683 discloses a system for improving the efficiency of an induction motor-type generator when it is less than fully driven. In that system, the induction motor, as a generator, is coupled to a commercial power line to which it delivers its output through a triac, which is controlled to have a relatively small, fixed firing angle.

It is the object of this invention to provide a control system which is adapted to optimumly couple an induction motor to a power line to enable it to operate with increased efficiency both during times when it is providing rotary power to a load and during times when a rotary driving force is applied to it.

SUMMARY OF THE INVENTION

In accordance with this invention, an induction motor is coupled to an A.C. power line through a triac, and a control circuit detects the power factor of operation of the motor and varies the advancement of the angle of firing of the triac directly as a function of the power factor and motor load. Additionally, circuit means are provided to limit the retardation of this firing angle to a minimum firing angle, a state which will automatically prevail when the motor is operating in a power generation mode.

BRIEF DESCRIPTION OF THE DRAWINGS

FIG. 2 is an electrical schematic diagram of alternate circuitry for a portion of FIG. 1.

DETAILED DESCRIPTION OF THE DRAWINGS

Figure 1:
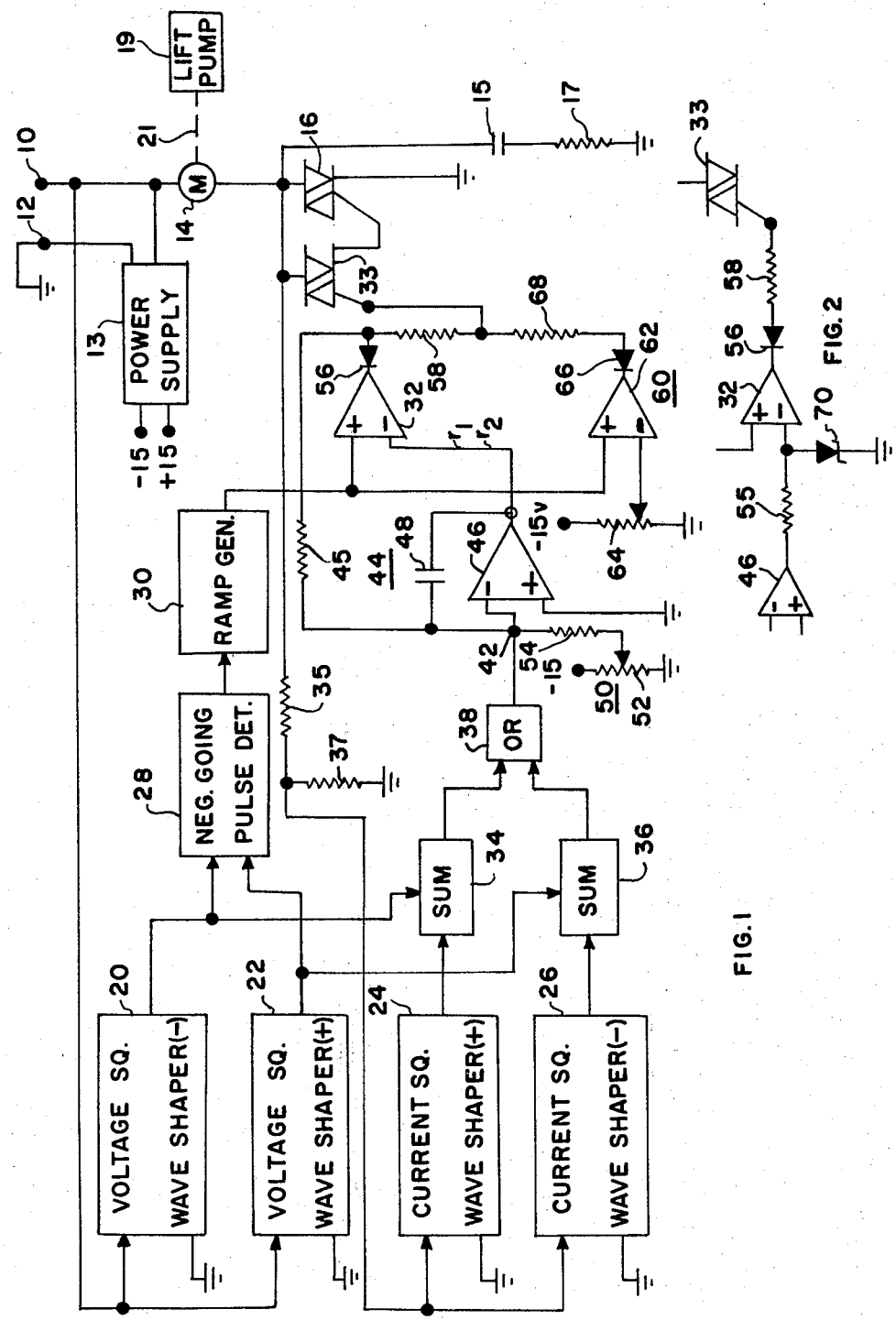
FIG. 1 is an electrical schematic diagram of an embodiment of the invention.

Referring to FIG. 1, an alternating current power line (115-volts, 60 Hertz A.C., and shown as waveform a of FIG. 3) is connected across terminals 10 and 12 as a power source. Power supply 13 is connected to these terminals, and it provides plus and minus 15 volts D.C. for operation of the circuitry shown in FIG. 1. Induction motor 14 is connected between A.C. power terminal 10 and through triac 16 to the circuit ground, which in turn is connected to A.C. terminal 12. In this fashion, induction motor 14 is powered by an A.C. line voltage (waveform a of FIG. 3) through triac 16, whereby the power input to motor 14 (illustrated by voltage waveform b and current waveform c) is controlled, control being by means of the circuitry shown herein, and wherein, by requiring motor 14 to operate with a selected power factor when operating in a motor mode, the power input to the motor is automatically regulated in accordance with the load applied to it. The voltage across triac 16 for the corresponding condition of waveform c is shown in waveform d. A conventional triac snubber circuit consisting of capacitor 15 and resistor 17 is connected across triac 16.

Significant to this invention is the assumption that induction motor 14 is employed to drive a load which at least at times changes to a driving force acting on the motor. As an example, motor 14 is illustrated as being coupled to a lift pump 19 by a rotary connection 21. As stated above, such pumps are used extensively in the pumping of oil from oil wells. On an upward or pumping stroke, driving motor 14 is loaded (to a variable degree, depending upon height or lift and quantity of oil lifted), and on a return or downstroke, the mass of the pump causes a torque to be coupled back to motor 14. The description of the control circuitry, which follows, initially describes the control effected on motor 14 during intervals when it is loaded.

Figure 3:
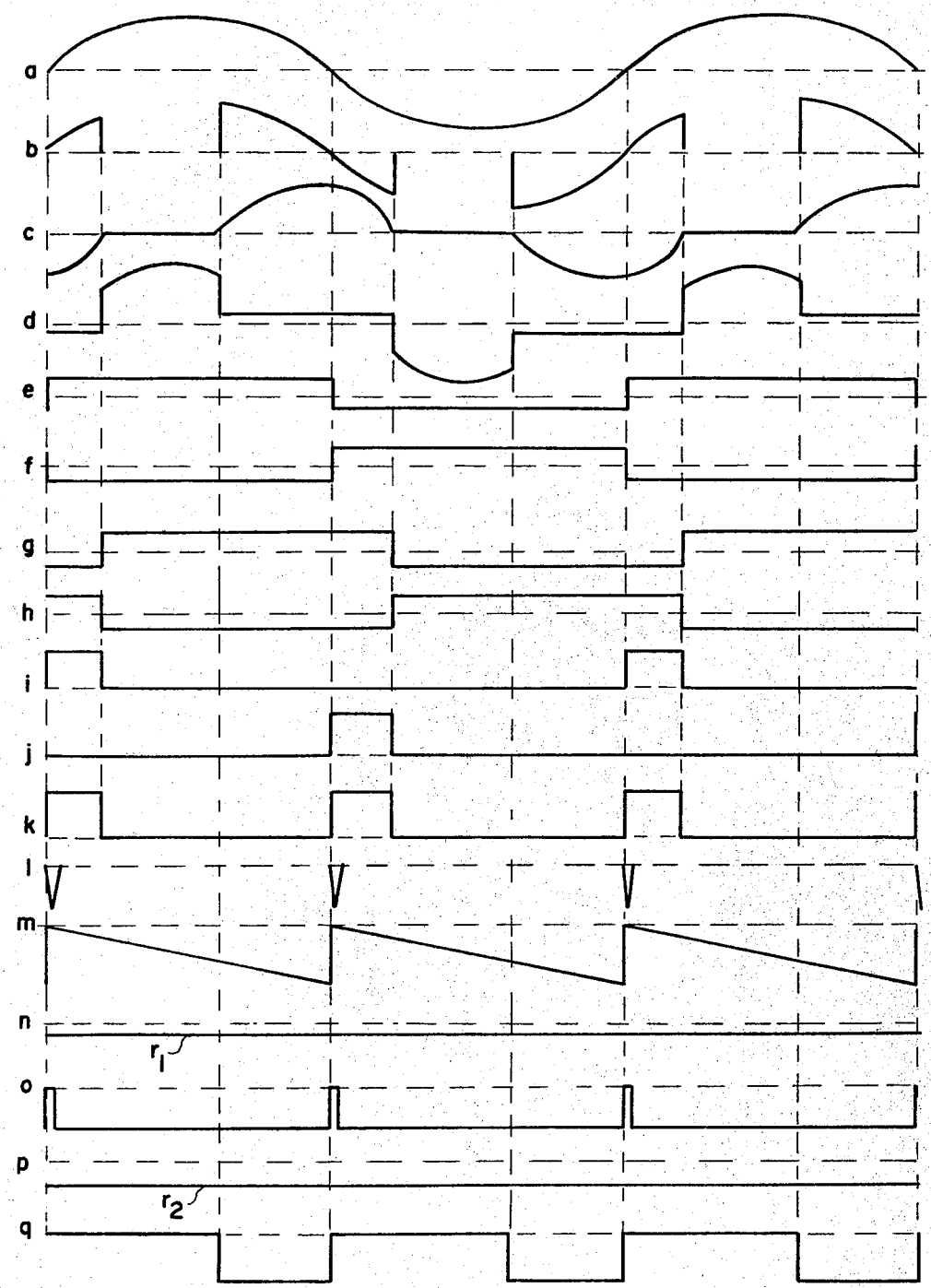
FIG. 3 shows a series of waveforms illustrating aspects of operation of the circuitry shown for a motor mode of operation.

Referring now to FIGS. 1 and 3, an A.C. voltage from a power line applied between terminals 10 and 12 is in turn applied to induction motor 14 through triac 16. This voltage is also supplied to the inputs of voltage square wave shapers 20 and 22, shaper 20 providing a first phase, full wave, rectangular wave output as shown in waveform f of FIG. 3, and shaper 22 providing a second, oppositely phased, full wave, rectangular wave output as shown in waveform e of FIG. 3. One output of each of voltage square wave shapers 20 and 22 is fed to negative going pulse detector 28, which provides a negative spike output (waveform 1 of FIG. 3). Spike pulses are then fed to ramp generator 30, which provides a ramp waveform each half cycle of the A.C. input as shown in waveform m of FIG. 3. This ramp waveform is applied to the plus, non-inverting, input of differential or operational amplifier 32, which functions as a zero crossing detector responsive to the combination of the ramp waveform and a power factor error signal (to be further described) supplied to the negative, inverting, input of amplifier 32. In turn, amplifier 32 provides a variable width control signal output for the turn-on of triac 33, and thereby triac 16, at a point which maintains the power factor of motor 14 at a commanded level.

To examine the development of the control signal, the two oppositely phased square wave signals (waveforms e and f) from square wave shapers 20 and 22 are provided as a basis for voltage "on" time referenced each half cycle, or 120 cycles per second, for comparison, at the same rate, with the "on" time square wave signals representative of current "on" time and thereby the development of a signal representative of voltage-current phase difference and thereby also indicative of the operating power factor of motor 14. The "on" time current signals are obtained by sensing the voltage across triac 16, it being noted in waveform c, showing motor current, and waveform d, showing triac voltage, that the trailing edge of one polarity of triac voltage marks the turn-on of a current half cycle, and the leading edge of the next, opposite, polarity portion of triac voltage marks the turn-off of that current half cycle. Sensing of triac voltage is accomplished by a voltage divider circuit consisting of resistors 35 and 37 connected across triac 16. The portion of triac voltage appearing across resistor 37 is provided as an input signal to current square wave shapers 24 and 26, which provide as outputs oppositely phased square waves as shown in waveforms g and h, respectively.

As stated, the operating power factor signal is derived from a motor voltage/current phase angle, and the latter is obtained by the following process. The positive outputs of voltage square wave shaper 20 and current wave shaper 24 are summed in summing device 34 to provide a pulse output as shown in waveform i of FIG. 3, and the positive outputs of voltage square wave shaper 22 and current square wave shaper 26 are summed in summing device 36 to provide a pulse output as shown in waveform j of FIG. 3. These two waveforms are combined by OR circuit 38 as shown in waveform k of FIG. 2, and, as combined, they are applied to summing junction 42 as an operating power factor signal.

By examining the process of forming waveforms i and j, it will be noted that each is turned "on" responsive to the turn-on of a voltage half cycle and turned "off" by the next following the turn-off of a current half wave cycle. Thus, the pulses each have a width proportional to the phase angle between motor current and voltage and occur at 120 cycles rates. The power factor is, of course, the cosine of the phase angle and thus varies inversely with the phase angle. Accordingly, an increase in phase angle is indicative of a decrease in power factor, and vice versa.

A control circuit signal is developed by the algebraic summing of a selected D.C. negative power factor control voltage with an integrated version of positive operating power factor signal (waveform k), this being done by applying a motor function command voltage and a power factor signal to summing junction 42, which is an input to operational amplifier 46 connected as integrator 44.

The command voltage is provided by command voltage circuit 50 which consists of potentiometer 52, across which is connected a negative 15-volt source. A selected portion of this voltage is provided by a resistor 54 connected between the movable arm of potentiometer 52 and summing junction 42. The effect of the summing of the voltages is that, as will be further described, the "on" time of triac 16 is regulated as a direct function of the value of the operational power factor signal voltage compared with the power factor command voltage in the manner described.

The command voltage from circuit 50 is set with motor 14 unloaded (as by disconnection of lift pump 19) and by adjustment of potentiometer 52. A power factor (or phase angle between current and voltage) is determined by choosing the greatest power factor (smallest motor current/phase difference) at which the motor will operate over a range of loads to be encountered.

The combination or sum of the command signal and power factor operating signal on summing junction 42 is applied to the inverting input of operational amplifier 46. Amplifier 46 is connected and operated as an integrator 44 by virtue of a capacitor 48 being connected between the output and inverting input of the amplifier. The positive or non-inverting input of operational amplifier 46 is connected to ground. Integrator 44 effectively smooths the pulse-type operating power factor signal, and the combined signals are amplified and appear at the output of operational amplifier 46 as a negative control signal, which shifts positively responsive to the presence of a higher than commanded power factor (indicated by equivalent smaller voltage-current phase angle), and shifts negatively when there is detected a lower than commanded power factor.

The control signal from the output of operational amplifier 46 is applied to the negative (inverting) input of operational amplifier 32, the ramp signal of waveform m being applied to the positive (non-inverting) input of operational amplifier 32 as described above. The control signal has the effect of varying the response of operational amplifier 32. Thus, with a basically zero level control signal, represented by reference line $r_1$ of waveform n, the output of operational amplifier 32 will be essentially held negative by the ramp signal, resulting in a triggering output pulse shown by waveform o of amplifier 32, which stays on for all or essentially all of each full half cycle. This would typically be the case where a motor was operated at a low power factor setting, or would be the case for a basically fully loaded motor operating at a higher power factor.

In contrast, a typical value for a less than loaded motor is represented by reference line $r_2$ of waveform p, the relative position of $r_2$ with respect to the ramp signal being such that operational amplifier 32 would be triggered "on" during the latter portion of each ramp signal (waveform m), commencing with the intersection of the ramp signal with reference line $r_2$. This produces an output pulse from operational amplifier 32 as indicated in waveform q shown for approximately 50% of the time and representative of the turn-on state of triac 16.

The output of operational amplifier 32 is applied through diode 56 and resistor 58 as a negative pulse (e.g., waveforms o and q) to the gate input of triggering or buffer triac 33, and its output is connected to the trigger input of triac 16, which actually determines the duty cycle of power input each half cycle to motor 14.

Ignoring for the moment any effect of a second input signal applied to the gate of gate 33, as will be described below, triac 16 is turned "on" each half cycle of the A.C. circuit for the pulse width of the negative pulse shown in waveform q for about 50% of the time of each half cycle of the A.C. input to motor 14. This turn-on state of triac 16 is illustrated in waveform d and would typically occur for a medium loading of motor 14 as, for example, when a lift stroke of lift pump 19 is pumping from a medium depth. If motor loading increases, as would be the case at the beginning of each lift stroke, as well as when the depth of lift or quantity of oil lifted increases, this increase would be detected by a decreased current voltage phase angle or increased power factor, and a positive going voltage (lesser negative value as illustrated by waveform o) from integrator 44 would be applied to operational amplifier 32. This produces an earlier turn-on of trigger triac 33 and provides an increase in power input via triac 16 to motor 14 to a level which returns the power factor to the commanded level.

When the load on motor 14 is decreased, during each stroke of pump 19, as when it transitions from an upstroke to a downstroke (or there is a decrease in the quantity of fluid lifted or depth from which it is lifted), there will initially occur an inherent increase in voltage/current phase angle (reduced operating power factor), and the opposite would occur, that is, the input to the motor would be decreased to a level which will produce the selected power factor. The net result is that when motor 14 is less loaded but still not significantly driven by lift pump 15, it is driven by a substantially lower average voltage, and thereby it draws substantially less power than would have been the case has a power factor control system not been employed.

As an additional feature operative to improve phase back when motor 14 is lightly loaded, a positive feedback loop is provided wherein the variable width negative pulse from operational amplifier 32 is coupled through resistor 45 to summing junction 42. Noting that this feedback pulse is of a negative polarity, it is of the same polarity as the command voltage and of the opposite polarity to the operating power factor signal. With this feed back signal summed with the other two signals, the effect is to increase the response of operational amplifier 46 adequately to create a change in control voltage level applied to the inverting input of operational amplifier 46 to cause a greater pulse width output of operational amplifier 32 upon an increased load being applied to motor 14. This effectively prevents motor stalling when the power factor set by command voltage device 50 is set to a point quite close to the stalling point of motor 14 without load.

The description up to this point has dealt with conditions present when lift pump 19 is applying some load to motor 14 (or a zero torque coupling prevails), which will be the case except when lift pump 19 is engaged in a downstroke. As soon as the lift stroke is completed, pump 19 will transition to a downstroke. When this occurs, it will then apply a torque to motor 14, and this will cause the motor to increase in speed. It will be assumed that this increase will cause a speed in excess of synchronization speed. The circuitry thus far described would then detect a decrease in power factor to a level which would reduce the firing angle of triac 16 to a quite small angle. Typically, this angle may be sufficiently small as to provide insufficient biasing to the motor to enable it to transition to a generating mode. To assure that this does not occur and that the motor does transition to a generating mode, circuitry is provided which limits the retardation of the firing angle to an angle of approximately 30° to 150° after the commencement of each half cycle of operation.

One circuit arrangement for accomplishing this is shown in FIG. 1 wherein a triggering pulse circuit 60 generates a fixed firing angle pulse each half cycle. It employs a differential amplifier in the form of an operational amplifier 62 which operates as a zero crossing detector in the same manner as operational amplifier 32 except that instead of being controlled by a power factor signal connected to its negative terminal, a selected, but otherwise fixed, bias is applied to this terminal. This bias is obtained from potentiometer 64, which is connected between −15 volts and ground. The movable arm of potentiometer 64 is set to provide a bias which, when related to a ramp waveform from ramp generator 30, applied to the positive input, causes operational amplifier 62 to turn "on," and thus provide an output pulse commencing at a selected point in time in each half cycle. Typically, this selection is made to provide the pulse at approximately the 150° point into each half cycle. This pulse, a negative one, is coupled through diode 66 and resistor 68 to the gate input of trigger triac 33. Thus, as will be noted, triac 33 is provided through what amounts to an OR circuit with two sets of triggering pulses, one, a variable-in-time set which is a function of the operating power factor of motor 14 as described above, and the other, a fixed-in-time set. As a result, triac 33 cannot be triggered later than the time occurrance of the fixed timed set of pulses. Since they would provide an approximately 30° period of firing, motor 14 will have been powered through triac 16, controlled by triac 33, for a sufficient bias to enable it to operate in a generating mode.

FIG. 2 illustrates an alternate method of limiting the retardation of the time of triggering "on" triac 33. In this circuit arrangement, the separate pulse generator 60 (FIG. 1) is omitted, and instead, a zenar diode 70 is placed between the negative, or control voltage, input of operational amplifier 32 and ground. The power factor error signal which is fed to this terminal through resistor 55 is prevented from exceeding a negative control value which will cause a pulse output of operational amplifier 32 to occur later than the selected time, e.g., no later than 150° into each half cycle.

As suggested above, the operation of the invention in a generating mode occurs when it is driven by pump 19 during a downstroke. By means of one of the two circuit arrangements described, triggering triac 33 will be triggered "on" (and thus triac 16 will be triggered "on") commencing at approximately the 150° point in each half cycle. From this time point until the end of the half cycle, motor 14 will actually receive power from the power line, and thus during this interval will, in effect, be operating in a motor mode. At the commencement of the next half cycle, and provided that sufficient torque is applied to motor 14 to cause its speed to exceed sync speed, motor 14 will commence supplying power back to the power line. The amplitude and portion of each cycle during which back current flows is a direct function of torque induced speed applied by pump 19 to motor 14.

Figure 4:
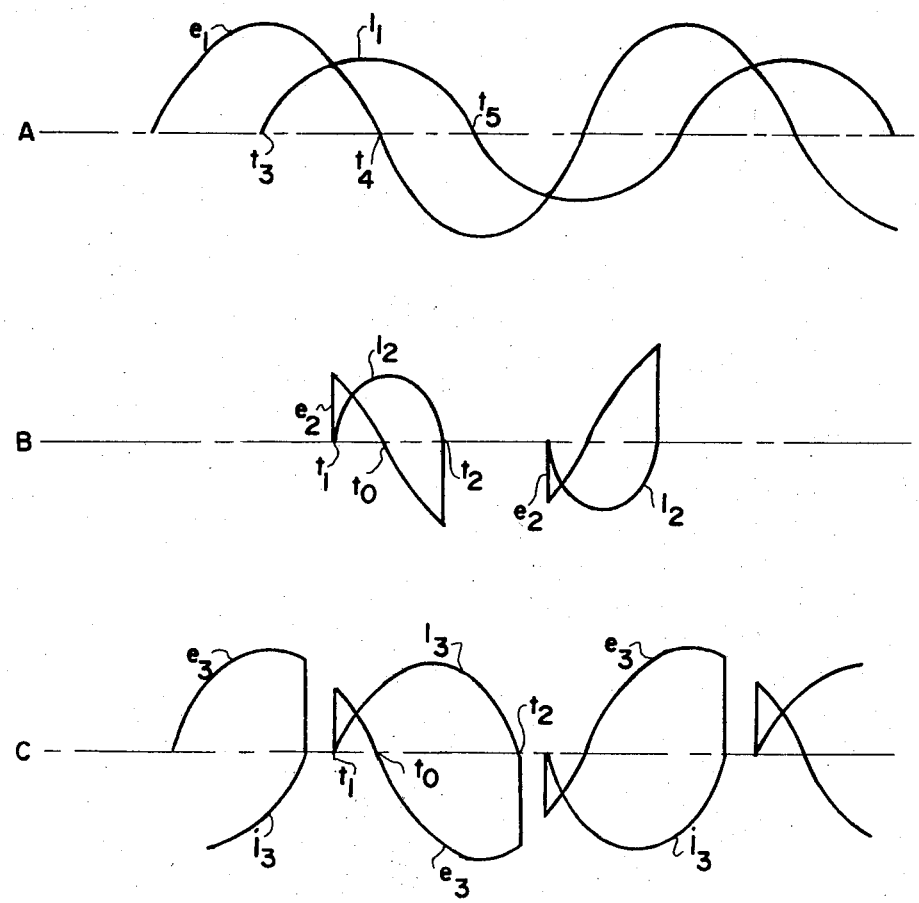
FIG. 4 shows a series of waveforms illustrating aspects of operation for a generating mode of operation.

The power generating mode will be better appreciated by the reference to the waveforms shown in FIG. 4. There, waveform A will be first examined, and it illustrates operation for a relatively low torque applied by pump 19 to motor 14, and, for comparison purposes, it is illustrative of a conventional case where triac 16 is omitted and motor 14 and the power line are directly connected. Curve $e_1$ is representative of line voltage applied at terminals 10 and 12. Curve $i_1$ is illustrated of current flow between an A.C. power line and induction motor 14.

Waveform B of FIG. 4 illustrates, comparatively, the electrical operation of the system constructed as illustrated by the circuits of FIG. 1 or 2 and wherein operation is for a like low torque condition to that depicted in waveform A. As described, in this case, triac 16 will be triggered "on" at approximately the 150° point $t_1$ in each half wave of voltage of cycle of power input from terminals 10 and 12. Voltage curve $e_2$ is illustrative of the voltage present on motor 14. Current $i_2$ is illustrative of current flow concurrent with voltage, both terminating at a point $t_2$ during each half cycle.

Significantly, it is to be noted with respect to waveforms A and B that when current and voltage are of a like polarity, power is being extracted from the line by motor 14 to energize its field; and when current and voltage are of an unlike polarity, it functions to furnish power back to the line.

To examine first the operation of the conventional case, and with reference to waveform A, it is to be noted that power is supplied by a power line to motor 14 from time point $t_3$ to time point $t_4$ and power supplied by motor 14 to the power line from time point $t_4$ to time point $t_5$. By examination of the curves during the two point intervals, it is to be appreciated that there would occur only a slightly greater magnitude of power flow (current times voltage) from the generator to the line than from the line to the generator. Thus, there is little net power supplied to the line.

In contrast, by the employment of the applicant's system, with the same torque from lift pump 19, the power supplied to the line by motor 14 exceeds the power consumed by a substantial margin. This is illustrated in waveform B by comparing the combination of voltage and current curves $e_2$ and $i_2$, respectively, for the power consumption interval from time point $t_1$ to time point $t_0$ and the power generation interval from time point $t_0$ to time point $t_2$.

Waveform C illustrates by voltage curve $e_3$ and current waveform $i_3$ operation of the system shown in FIG. 1 for a relatively high torque being applied by pump 19 to motor 14. Here, as will be noted, the energization period for the motor is the same as shown in waveform B, from time point $t_1$ to time point $t_0$, but the power generation portion from $t_0$ to the end of the current half cycle $t_2$ is significantly expanded.

Comparing the curves shown in waveforms B and C, it is to be noted that with increased torque applied to motor 14, a current lag, illustrated by curves $i_2$ and $i_3$, increases, extending further to the right. This reflects an increased period of current flow, and inherently, triac 16 stays a longer in each half cycle. So long as triac 16 is on, a voltage is applied to motor 14, with the result that power is then transferred by motor 14 to the power line. As shown, the power transfer increases with increased torque applied to motor 14, and, of course, this being for conditions wherein the motor speed remains above synchronization speed.

From the foregoing, it is to be appreciated that the present invention provides a system for reducing the overall power consumption of electromechanical installations wherein machinery is powered by an induction motor, and wherein the machinery is of a character which at times during its operation effects a torque back on the motor.

I claim:

1. A power control for an induction motor powered by an A.C. line, and operated in both motor and generating modes, comprising:

detection means responsive to motor voltage and current for providing an output signal proportional to the power factor of operation of said motor;

a power factor command signal;

summing means responsive to said power factor command signal and said output signal of said detection means for providing an error signal;

signal means responsive to said error signal for providing at least one pulse each half cycle of A.C., including a pulse each half cycle which has a leading edge which is variable in time as a function of said error signal;

control means connected to an A.C. line and responsive to the pulse output of said signal means for turning on current flow to said motor in each half cycle of A.C. upon receipt of a first pulse received during that half cycle; and second signal means in circuit with said signal means for limiting the latest time in a half cycle at which said first pulse is supplied to said control means.

2. A power control as set forth in claim 1 wherein said second signal means includes means for generating a said pulse with a leading edge occurring at a selected fixed time in each half cycle.

3. A power control as set forth in claim 1 wherein said second signal means includes means coupled to said error signal for limiting the value of said error signal in a direction wherein said pulse which had a leading edge which is variable in time in limited in its variability as to its latest time of commencement.

4. A power control as set forth in claim 2 wherein:
said signal means includes:
   ramp generation means responsive to an A.C. voltage being supplied to said motor for providing a ramp waveform each half cycle of operation, and
   differential amplification means responsive to said ramp waveform and said error signal for generating said pulse which has a leading edge which is variable in time as a function of said error signal;
said second signal means comprises:
   reference signal means for selectively providing a reference voltage, and
   second differential amplification means responsive to said ramp waveform and said reference voltage for generating said pulse with a leading edge arising at a selected fixed time in each half cycle; and
said signal means further comprises combining means responsive to the outputs of said first and second differential amplification means for providing pulse inputs to said control means;
whereby pulses from both said differential amplification means are provided to said control means, which is turned on in each half cycle responsive to the first occurring pulse in each half cycle from one of said differential amplification means.

5. A power control as set forth in claim 3 wherein means for limiting the value of said error signal comprises a zenar diode.

6. An electromotive system operable from an alternating current line comprising:
a source of alternating current;
an induction motor;
rotary means coupled to said induction motor for alternately providing a load on, and torque to, said induction motor;
detection means responsive to motor voltage and current for providing an output signal proportional to the power factor of operation of said motor;
a power factor command signal;
summing means responsive to said power factor command signal and said output signal of said detection means for providing an error signal;
signal means responsive to said error signal for providing at least one pulse each half cycle of alternating current, including a pulse each half cycle which has a leading edge which is variable in time as a function of said error signal;
control means responsive to the pulse output of said signal means for turning on current flow from said source of alternating current to said motor in each half cycle of alternating current upon receipt of a first pulse received during that half cycle; and
second signal means in circuit with said signal means for limiting the latest time in a half cycle at which the said first pulse occurs.

* * * * *